United States Patent
Wang (10) Patent No.: US 12,260,671 B2
(45) Date of Patent: Mar. 25, 2025

(54) UNDER-SCREEN FINGERPRINT IDENTIFICATION SYSTEM, BACKLIGHT MODULE, LIGHT SOURCE ASSEMBLY AND DISPLAY SCREEN

(71) Applicant: BEIJING XIAOMI MOBILE SOFTWARE CO., LTD., Beijing (CN)

(72) Inventor: Gang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 55 days.

(21) Appl. No.: 16/892,109

(22) Filed: Jun. 3, 2020

(65) Prior Publication Data

US 2021/0133419 A1    May 6, 2021

(30) Foreign Application Priority Data

Oct. 31, 2019 (CN) .......................... 201911063191.5

(51) Int. Cl.
*G06V 40/13* (2022.01)
*G09G 3/34* (2006.01)
(Continued)

(52) U.S. Cl.
CPC ....... *G06V 40/1318* (2022.01); *G09G 3/3406* (2013.01); *G09G 3/3648* (2013.01); *H04M 1/0266* (2013.01); *H04M 2201/38* (2013.01)

(58) Field of Classification Search
CPC .......... G06K 9/00–0012; G06F 3/0412; G06F 3/042–0428; G06F 2203/04109;
(Continued)

(56) References Cited

U.S. PATENT DOCUMENTS

2008/0297684 A1* 12/2008 Tanaka ............... G02B 6/009
362/632
2011/0221705 A1* 9/2011 Yi ..................... G06F 3/0425
345/175
(Continued)

FOREIGN PATENT DOCUMENTS

CN    208460037 U    2/2019
CN    208985184 U    6/2019
(Continued)

OTHER PUBLICATIONS

Translation of CN110309748A (Year: 2019).*
(Continued)

*Primary Examiner* — Roberto W Flores
(74) *Attorney, Agent, or Firm* — Syncoda LLC; Feng Ma (57) ABSTRACT

A display screen includes a display panel; a backlight module disposed under the display panel and having a backlight source configured to provide backlight; and an under-screen fingerprint identification system, including a fingerprint light source configured to provide fingerprint identification light and a fingerprint sensor configured to receive fingerprint identification light. The fingerprint light source and the backlight source are formed integrally, and the fingerprint light source is located above the backlight source; the fingerprint sensor is disposed under the backlight module; light emitted from the fingerprint light source can transmit through the display panel to a finger, be reflected by the finger and then transmitted through the display panel and the backlight module to the fingerprint sensor.

16 Claims, 3 Drawing Sheets

(51) Int. Cl.
*G09G 3/36* (2006.01)
*H04M 1/02* (2006.01)

(58) Field of Classification Search
CPC ........ G09G 3/3648; G09G 3/34–3493; H04M
1/0266; H04M 2201/38; G02F 1/13338;
G02F 1/1336–133628; G06V 40/1318
See application file for complete search history.

(56) References Cited

U.S. PATENT DOCUMENTS

| | | | | |
|---|---|---|---|---|
| 2012/0268701 | A1* | 10/2012 | Nemoto | G06F 3/042 349/106 |
| 2013/0010496 | A1* | 1/2013 | Higashi | G02B 6/0031 362/609 |
| 2013/0050149 | A1* | 2/2013 | Rattray | G06F 3/0425 345/175 |
| 2014/0218327 | A1* | 8/2014 | Shi | G06V 40/1318 345/174 |
| 2017/0286742 | A1 | 10/2017 | Mackey et al. | |
| 2017/0336836 | A1* | 11/2017 | Mörsky | G06V 40/166 |
| 2017/0372114 | A1* | 12/2017 | Cho | G06V 40/1318 |
| 2019/0026523 | A1 | 1/2019 | Shen et al. | |
| 2021/0124199 | A1* | 4/2021 | Qing | G02F 1/133314 |

FOREIGN PATENT DOCUMENTS

| | | | | |
|---|---|---|---|---|
| CN | 209312045 | U | 8/2019 | |
| CN | 110309748 | A * | 10/2019 | G02F 1/133615 |
| CN | 110376794 | A | 10/2019 | |

OTHER PUBLICATIONS

Extended European Search Report in Application No. 20184628, mailed on Mar. 24, 2021.
CN First office action in application No. 201911063191.5, mailed on Dec. 24, 2024.

* cited by examiner

UNDER-SCREEN FINGERPRINT IDENTIFICATION SYSTEM, BACKLIGHT MODULE, LIGHT SOURCE ASSEMBLY AND DISPLAY SCREEN

CROSS-REFERENCE TO RELATED APPLICATION

This application claims priority to Chinese Patent Application No. 201911063191.5 filed on Oct. 31, 2019, the disclosure of which is hereby incorporated by reference in its entirety.

BACKGROUND

With the development of electronic technologies, display screens of electronic devices tend to adopt full screens having higher screen-to-body ratio. For an organic light-emitting diode (OLED) display screen, an under-screen optical fingerprint identification system can be adopted. The under-screen optical fingerprint identification system of the OLED display screen can detect a fingerprint by utilizing light transmission property of the OLED display screen.

SUMMARY

The present disclosure relates generally to the field of object identification, and more specifically to an under-screen fingerprint identification system, a backlight module, a light source assembly, and a display screen.

Various embodiments of the present disclosure can provide an under-screen fingerprint identification system, a backlight module, a light source assembly, a display screen and an electronic device to effectively reduce a chin size of the electronic device.

According to a first aspect of the embodiments of the present disclosure, there is provided a display screen including:
- a display panel;
- a backlight module, disposed under the display panel and including a backlight source configured to provide backlight; and
- an under-screen fingerprint identification system, including a fingerprint light source configured to provide fingerprint identification light and a fingerprint sensor configured to receive fingerprint identification light;
- wherein the fingerprint light source and the backlight source are formed integrally and the fingerprint light source is located above the backlight source; the fingerprint sensor is disposed under the backlight module; the fingerprint identification light emitted from the fingerprint light source are transmitted through the display panel to a finger, reflected by the finger and then transmitted through the display panel and the backlight module to the fingerprint sensor.

In some embodiments, the display screen further includes a first holder and a second holder which are formed integrally and fixed under the display panel, wherein, the first holder is located under the second holder, the backlight source is disposed in the first holder, and the fingerprint identification light source is disposed in the second holder.

In some embodiments, a first opening is disposed at a side of the first holder, and a second opening is disposed at a top of the second holder.

In some embodiments, the display panel includes a flexible circuit board electrically connected with the fingerprint sensor, a first metal wiring is disposed on the flexible circuit board, and a first light avoidance area is formed at a position of the first metal wiring corresponding to the second opening.

In some embodiments, the display panel includes a TFT substrate electrically connected with the flexible circuit board, a second metal wiring is disposed on the TFT substrate, and a second light avoidance area is formed at a position of the second metal wiring corresponding to the second opening.

In some embodiments, wavelength range of fingerprint identification light emitted from the fingerprint light source is different from that of the backlight emitted from the backlight source.

In some embodiments, the fingerprint light source is an infrared source and the backlight source is a white light source.

In some embodiments, the backlight module further includes a reflection layer disposed at a side of the backlight source and configured to reflect the backlight and transmit the fingerprint identification light.

In some embodiments, the backlight module further includes a casing in which the backlight source and the reflection layer are disposed, the casing is provided with a through-hole through which the fingerprint identification light pass, and the finger sensor is disposed corresponding to the through-hole under the casing.

In some embodiments, an absorbing coating for absorbing the fingerprint identification light is disposed at an inner surface of the casing.

According to a second aspect of the embodiments of the present disclosure, there is provided an electronic device including a device body and the display screen of any embodiment described as above, which is assembled with the device body.

According to a third aspect of the embodiments of the present disclosure, there is provided an under-screen fingerprint identification system, which is applied to a display screen with a backlight module including a backlight source configured to provide backlight; the under-screen fingerprint identification system includes:
- a fingerprint light source configured to provide fingerprint identification light, which is disposed integrally with the backlight source and located above the backlight source; and
- a fingerprint sensor configured to receive the fingerprint identification light, which is disposed below the backlight module.

According to a fourth aspect of the embodiments of the disclosure, there is provided a backlight module, which is applied to a display screen with an under-screen fingerprint identification system including a fingerprint light source configured to provide fingerprint identification light; the backlight module includes:
- a backlight source configured to provide backlight, which is disposed integrally with the fingerprint identification light source and located below the fingerprint light source; and
- a reflection layer disposed at a side of the backlight source, which is capable of reflecting the backlight and transmitting the fingerprint identification light.

According to a fifth aspect of the embodiments of the disclosure, there is provided a light source assembly, which is applied to a display screen with an under-screen fingerprint identification system; the light source assembly includes a fingerprint light source configured to provide fingerprint identification light, a backlight source configured to provide backlight, and a first holder and a second holder disposed integrally, wherein the backlight source is disposed in the first holder, and the fingerprint identification light source is disposed in the second holder.

In some embodiments, a first opening is disposed at a side of the first holder and a second opening is disposed at a top of the second holder.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the disclosure and, together with the disclosure, serve to explain the principles of the disclosure.

DETAILED DESCRIPTION

Reference will now be made in detail to exemplary embodiments, examples of which are illustrated in the accompanying drawings, without limiting the present disclosure. All variations to configuration, method or function made by a person of ordinary skill in the art according to these embodiments are included in the scope of the present disclosure. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Terms used in this application are only for the purpose of describing specific embodiments instead of limiting this application. The singular forms "a/an," "the" and "said" used in this application and the attached claims are intended to include the plural forms, unless the context clearly indicates otherwise. It should be understood that terms "and/or" used herein refers to and includes any or all possible combinations of one or more of the associated listed items.

For a full-screen display, there is often not sufficient space for a capacitive fingerprint module to be placed on the screen, and under-screen optical fingerprint identification can be adopted.

In a case of a liquid crystal display (LCD), a fingerprint identification light source is generally disposed at the side of a display panel of a mobile terminal, thereby increasing a chin size of an electronic device such as a mobile terminal and affecting effective display area of a display screen of the mobile terminal. Term "chin" herein is intended to represent a lower portion of the electronic device such as a mobile phone where some touch keys such as "home" are provided.

Various embodiments of the present disclosure can address issues involving that a chin size of an electronic device such as a mobile terminal is increased and an effective display area of a display screen of the mobile terminal is affected.

An under-screen fingerprint identification system, a backlight module, a light source assembly, a display screen and an electronic device according to various embodiments of the present disclosure are capable of effectively reducing chin size of the electronic device. Hereinafter, the under-screen fingerprint identification system, the backlight module, the light source assembly, the display screen and the electronic device of the present disclosure will be described in detail in combination with the accompany drawings. Under the circumstances of no conflict, features in following embodiments and implementations may be combined each other.

Figure 1:
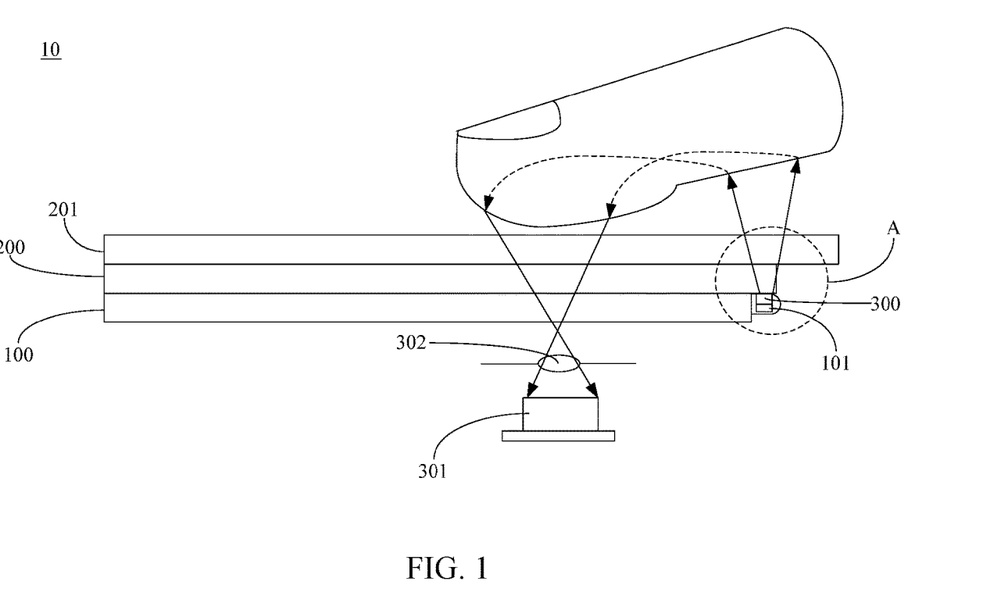
FIG. 1 is a structural schematic diagram illustrating a display screen in accordance with some embodiments of this disclosure.

Referring to FIG. 1, the embodiment of the present disclosure provides a display screen 10 including an under-screen fingerprint identification system, a backlight module 100 and a display panel 200. It will be appreciated that the display screen 10 in the present disclosure, which may refer to an LCD screen, may be applied to any electronic device with under-screen fingerprint identification function of the LCD display screen, such as a smart cellphone, a laptop, a wearable device, household appliances, and the like.

The backlight module 100, comprising a backlight source 101 configured to provide backlight, are disposed below the display panel 200. The backlight module 100 is mainly configured to provide backlight with sufficient and uniform brightness for the display panel 200, and the display panel 200 may modulate the backlight in accordance with the requirements to display different images. Therefore, the display panel 200 may realize the display function under the illumination of backlight emitted from the backlight source 101 of the backlight module 100.

The under-screen fingerprint identification system comprises a fingerprint light source 300 configured to provide fingerprint identification light and a fingerprint sensor 301 configured to receive fingerprint identification light. The fingerprint light source 300 is disposed integrally with the backlight source 101 and located above the backlight source 101. The fingerprint sensor 301 is disposed below the backlight module 100.

The process of the fingerprint identification conducted by the under-screen fingerprint identification system is that: when a user presses on the display panel 200 with a finger, fingerprint identification light emitted from the fingerprint light source 300 are transmitted through the display panel 200 to the finger, and a part of fingerprint identification light is diffused by the texture of finger pads of fingers after transmission within the finger, reflected by the finger, and then transmitted through the display panel 200 and the backlight module 100 to the fingerprint sensor 301, so as to form fingerprint image of valleys and ridges of the finger. The fingerprint sensor 301 generates fingerprint image data for fingerprint identification in accordance with received fingerprint identification light with the fingerprint information. Propagation path of fingerprint identification light is shown by arrows in FIG. 1.

In some embodiments, the fingerprint sensor 301 may be referred as an optical sensor, an image sensor, an optical fingerprint sensor, an optical inductor or a fingerprint detection inductor, etc. The under-screen fingerprint identification system may further comprise a lens structure 302 disposed above the fingerprint sensor 301, which may better converge the fingerprint identification light being reflected by the finger and then passing through the display panel 200 and the backlight module 100 to the fingerprint sensor 301, so as to improve accuracy of fingerprint identification.

In the display screen 10 according to some embodiments of the present disclosure, since the fingerprint light source 300 and the backlight source 101 are formed integrally to form a twin structure and the fingerprint light source 300 is disposed above backlight source 101, the fingerprint light source 300 doesn't occupy transverse space of the electronic device and the chin size of the electronic device is effectively reduced, thereby increasing screen-to-body ratio and realizing full screen.

In some alternative embodiments, the display panel 200 may comprise cover plate 201 disposed at an upper surface of the display panel 200, for protecting the display panel 200, without affecting fingerprint identification light with the fingerprint information. In some embodiments, the cover plate 201 may be a glass cover plate mainly for protecting the display panel 200 without affecting the display effect. When a user presses on the display panel 200 with a finger, fingerprint identification light emitted from the fingerprint light source 300 are transmitted through the display panel 200 and the cover plate 201 to the finger, reflected by the finger and then transmitted through the cover plate 201, the display panel 200 and the backlight module 100 to the fingerprint sensor 301, and the fingerprint sensor 301 generates fingerprint image data for fingerprint identification in accordance with received fingerprint identification light with the fingerprint information.

In some alternative embodiments, for ensuring accuracy of fingerprint identification, the fingerprint identification light emitted from the fingerprint light source 300 should be different from the backlight emitted from the backlight source 101. Wavelength range of the fingerprint identification light emitted from the fingerprint light source 300 is different from that of the backlight emitted from the backlight source 101. Each of the wavelength range of fingerprint identification light emitted from the fingerprint light source 300 and that of the backlight emitted from the backlight source 101 may be specifically preset in accordance with requirements. For example, if the wavelength range of the backlight emitted from the backlight source 101 is of visible light, then the wavelength range of light the fingerprint light source 300 is of invisible light.

In these embodiments, the wavelength range of the fingerprint identification light emitted from the fingerprint light source 300 is of infrared light, and wavelength range of the backlight emitted from the backlight source 101 is of visible light, namely, the fingerprint light source 300 is an infrared light source, and the backlight source 101 is a white light source. For example, the infrared light source may be infrared LED light source, infrared Vertical Cavity Surface Emitting Laser (VCSEL for short), infrared Laser Diode, etc. In other embodiments, the wavelength range of the fingerprint identification light emitted from the fingerprint light source 300 may be of ultraviolet light, etc. The infrared light source as the fingerprint light source 300 is beneficial to avoiding the interference of the fingerprint identification light with the backlight for display, so as to ensure the display effect of the display panel, and is also beneficial to avoiding the interference of the backlight with the fingerprint identification light, so as to effectively guarantee the accuracy of fingerprint detection.

Figure 2:
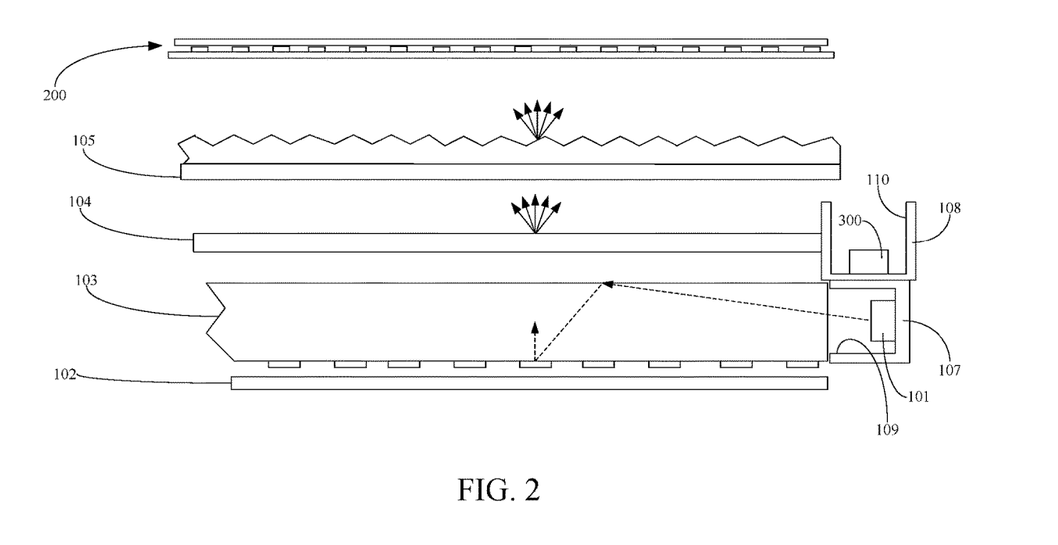
FIG. 2 is a structural schematic diagram illustrating a backlight module of a display screen in accordance with some embodiments of this disclosure.
Figure 3:
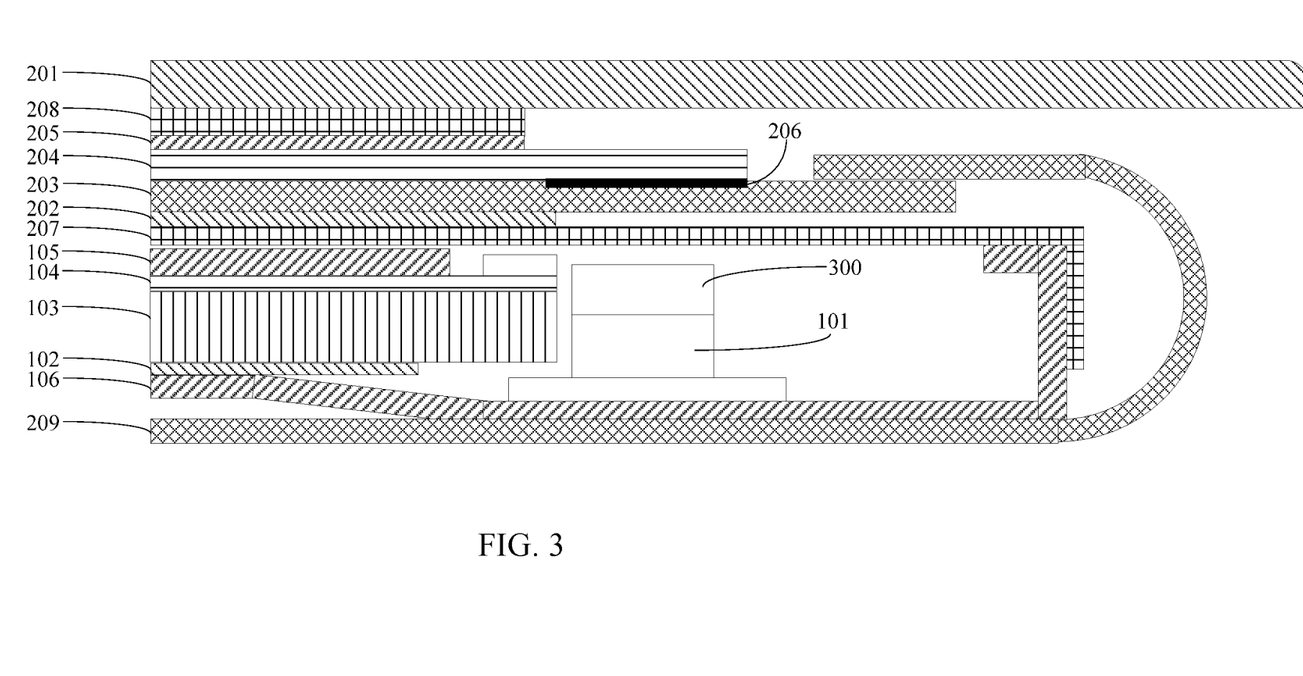
FIG. 3 is a partial enlarged view of a portion "A" shown in FIG. 1.

Referring to FIGS. 2 and 3, in some alternative embodiments, the backlight module 100 comprises the backlight source 101 configured to provide the backlight, a reflection layer 102, a light guide part 103 disposed above the reflection layer 102, the diffusion layer 104 disposed above the light guide part 103, and a brightness enhancement layer 105 disposed above the diffusion layer 104. The backlight source 101 is disposed at a side of the reflection layer 102 and the light guide part 103 such that the backlight emitted from the backlight source 101 is reflected by the light-guide part 103, and passes through the diffusion layer 104 and the brightness enhancement layer 105 in series, and then goes into the display panel 200, propagation path of which is shown by arrows in FIG. 2.

The reflection layer 102 is disposed below the light-guide part 103 to reflect the leak light at different levels of the backlight module 100 to the out-light surface of the backlight module 100 to improve efficiency of the backlight module 100 and elevate the brightness. These light reflected back into the light guide part 103 may emit from a front side of the light guide part 103 directly or after diffusion such as total reflection within the light guide part 103. According to different needs, the light guide part 103 may comprise the LGP or LGF, etc., but not limited thereto in the present disclosure. In the present embodiment, as an example that the light guide part 103 comprises the LGP, optical grade acrylic or PC material may be used to enable the light guide part 103 to have extremely high reflectivity, without absorbing light.

The backlight module 100 may also comprise the first holder 107 and the second holder 108 disposed integrally, which are fixed below the display panel 200. The first holder 107 and the second holder 108 may be two separate parts connected with each other or formed integrally. The first holder 107, in which the backlight source 101 is disposed, is located below the second holder 108, in which the fingerprint identification light source 300 is disposed. The backlight source 101 and fingerprint light source 300 are respectively disposed in the first holder 107 and the second holder 108 formed integrally such that an integral twin structure of fingerprint light source 300 and backlight source 101 is formed. In some embodiments, the first holder 107 and the second holder 108 disposed integrally are fixed at the sides of the light guide part 103 and the diffusion layer 104 and are located below the display panel 200.

A first opening 109 is disposed at a side of the first holder 107, a second opening 110 is disposed at a side of the second holder 108. It will be understood that the first opening 109 is disposed toward the light guide part 103 to realize a function of side emission so as to more conveniently guide the backlight emitted from the backlight source 101 to the light guide part 103 and then to the display panel 200 through the diffusion layer 104 and the brightness enhancement layer 105 in series after being reflected. It will be understood that the second opening 110 is disposed toward the display panel 200 such that light emitting direction of the fingerprint light source 300 is away from the backlight source 101, to realize a function of top illumination so as to more conveniently guide the fingerprint identification light emitted from the fingerprint light source 300 to the display panel 200.

For ensuring fingerprint identification light emitted from the fingerprint light source 300 to pass through the backlight module 100, each of the reflection layer 102, the light guide part 103, the diffusion layer 104 and the brightness enhancement layer 105 may adopt film materials which the infrared light may penetrate. As such, the reflection layer 102 may transmit the fingerprint identification light and reflect the backlight to the light-guide part 103 so that the fingerprint identification light emitted from the fingerprint light source 300 can pass through the backlight module 100. Accordingly, it would be assured that not only the backlight emitted from the backlight source 101 cannot interfere with the fingerprint identification light after passing through the backlight module 100, but also the fingerprint identification light emitted from the fingerprint light source 300 can pass through the backlight module 100 and then be received by the fingerprint sensor 301, without affecting the accuracy of fingerprint identification.

Herein, the diffusion layer 104 is mainly for diffusing the backlight evenly so that light intensity at the out-light surface of the backlight module 100 is more even. For avoiding the diffusion layer 104 to diffuse the fingerprint identification light with fingerprint information to cause distortion, the diffusion layer 104 may adopt materials or structures that the diffusion of at least a part of the fingerprint identification light with fingerprint information is less than or equal to a designated threshold. Accordingly, the backlight module 100 can not only provide the backlight meeting requirements of using the display screen, but also ensure no serious distortion when the fingerprint identification light with fingerprint information passes through the backlight module 100, so as to guarantee the accuracy of fingerprint identification.

The backlight module 100 may further comprise a casing 106, in which all of the backlight source 101, the reflection layer 102, the light guide part 103, the diffusion layer 104 and the brightness enhancement layer 105 of the backlight module 100 are disposed, for protecting each part of the backlight module 100. It will be understood that the fingerprint light source 300 is also disposed in the casing 106 since the fingerprint light source 300 and the backlight source 101 are disposed integrally as a twin structure. The casing 106 is formed with a through-hole through which the fingerprint identification light emitted from the fingerprint light source 300 may pass, and the fingerprint sensor 301 is disposed below the casing 106 corresponding to the through-hole. Accordingly, after passing through the casing 106, the fingerprint identification light is received by the fingerprint sensor 301 and hence pass through the backlight module 100, so as to guarantee the accuracy of fingerprint identification. In some other embodiments, the backlight module 100 may not be provided with the casing 106.

An absorbing coating, for absorbing fingerprint identification light, is disposed on an inner surface of the casing 106. In the present embodiment, as an example that the fingerprint identification light is infrared light, the inner surface of the casing 106 is treated to form an absorbing coating which may absorb the infrared light, so as to prevent the environmental noise created by repeated reflection of the infrared light.

When a user presses on the display panel 200 with a finger, the fingerprint identification light emitted from the fingerprint light source 300 are transmitted through the display panel 200 to the finger, and a part of fingerprint identification light is diffused by the texture of finger pads of fingers after transmission in the finger, reflected by the finger, and then transmitted through the display panel 200 and the reflection layer 102, the diffusion layer 104 and the brightness enhancement layer 105 of the backlight module 100 to the fingerprint sensor 301.

Referring to FIGS. 2 and 3, a partial enlarged view of a portion "A" of FIG. 1 may be understood as a schematic diagram illustrating the inner structure of ends of the display screen 10. The display panel 200 comprises a first polarizing sheet 202, a TFT (Thin Film Transistor) substrate 203, a CF (Color Filter) substrate 204 and a second polarizing sheet 205. The TFT substrate 203 and the CF substrate 204 are located between the first polarizing sheet 202 close to the backlight module 100 and the second polarizing sheet 205 away from the backlight module 100. The TFT substrate 203 is located below the CF substrate 204, and an adhesive layer 206 may be disposed between the TFT substrate 203 and the CF substrate 204. A shading tape 207 may be disposed between the first polarizing sheet 202 and the brightness enhancement layer 105 of the backlight module 100. The cover plate 201 and the second polarizing sheet 205 are fixed with each other by optical transparent glue 208 disposed therebetween.

When a user presses on the display panel 200 with a finger, the fingerprint identification light emitted from the fingerprint light source 300 are transmitted through the first polarizing sheet 202, the TFT substrate 203, the CF substrate 204, and the second polarizing sheet 205 of the display panel 200 to the finger, and a part of the fingerprint identification light is diffused by the texture of finger pad of the finger after transmission in the finger, reflected by the finger, and then pass through the second polarizing sheet 205, the CF substrate 204, the TFT substrate 203, and the first polarizing sheet 202 of the display panel 200 and the reflection layer 102, the diffusion layer 104 and the brightness enhancement layer 105 of the backlight module 100 to the fingerprint sensor 301.

It will be understood that, for realizing the function of side emission of the backlight source 101, the twin structure of the fingerprint light source 300 and backlight source 101 disposed integrally is located at an end of the display screen 10. The display panel 200 may also comprises flexible printed circuit (FPC for short) 209, one part of which is formed along a direction of the casing 106 of the backlight module 100 and the other of which is bent to electrically connect with TFT substrate 203. The fingerprint sensor 301 may be disposed below the flexible printed circuit 209 and electrically connected with flexible printed circuit 209, and both fingerprint light source 300 and backlight source 101 may be electrically connected with flexible printed circuit 209. Flexible printed circuit 209 may supply power to the backlight source 101, the fingerprint light source 300, the fingerprint sensor 301 and TFT substrate 203 and apply corresponding controlling order, to ensure that the display screen 10 can realize display function and fingerprint identification function.

Herein, for realizing functions of electrical connection, flexible printed circuit 209 is provided with a first metal wiring (may be referred to as golden finger) for transmitting s signal, and TFT substrate 203 is provided with a second metal wiring for transmitting a signal. Since infrared light transmittance of metal wiring is relatively low, which is disadvantageous for propagation of the fingerprint identification light, the first metal wiring is formed with a first light avoidance area corresponding to the second opening 110 and the second wiring is formed with a second light avoidance area corresponding to the second opening 110, so as to avoid the fingerprint identification light emitted from fingerprint light source 300, allowing the fingerprint identification light to smoothly pass through the display panel 200 and thereby ensuring the accuracy of fingerprint identification.

Figure 4:
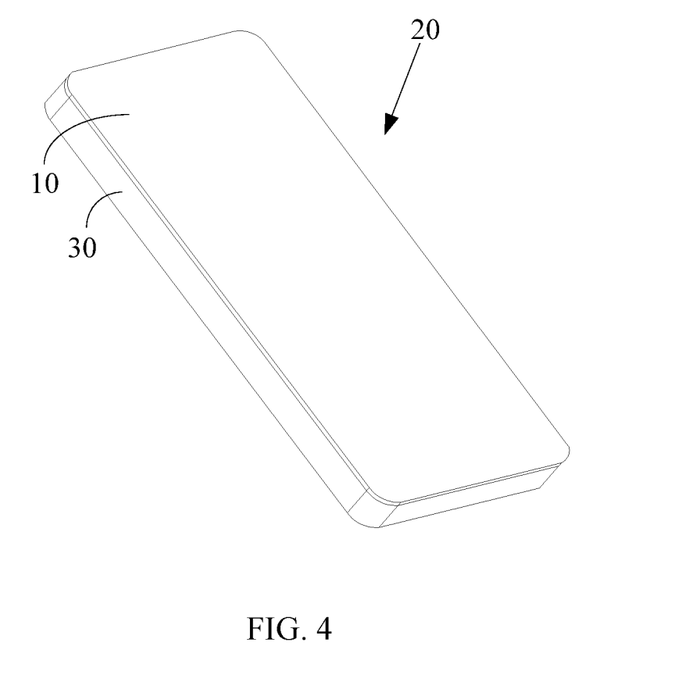
FIG. 4 is a structural schematic diagram illustrating an electronic device in accordance with some embodiments of this disclosure.

Referring to FIG. 4, the embodiments of the present disclosure further provide an electronic device 20 comprising a device body 30 and a display screen 10 assembled with the device 30. It should be noted that, display screens described in above embodiments and implementations may be applied to the electronic device 20 of the present disclosure. The electronic device 20 may be a smart cellphone, a laptop, a wearable device, household appliances, etc.

In the electronic device 20 according to some embodiments of the present disclosure, since the fingerprint light source 300 and the backlight source 101 of the display screen are disposed integrally to form a twin structure and the fingerprint light source 300 is disposed above the backlight source 101, the fingerprint light source 300 doesn't occupy transverse space of the electronic device and the chin size of the electronic device is effectively reduced, thereby increasing screen-to-body ratio and realizing full screen.

Various embodiments of the present disclosure further provide an under-screen fingerprint identification system, which is applied to a display screen with a backlight module. The under-screen fingerprint identification system comprises a fingerprint light source configured to provide fingerprint identification light and a fingerprint sensor configured to receive fingerprint identification light. The fingerprint light source is disposed with the backlight source integrally and is located above the backlight source, and the fingerprint sensor is disposed below the backlight module. It should be noted that the under-screen fingerprint identification system set forth by the embodiments of the present disclosure may be an under-screen fingerprint identification system of the display screen 10 described in above embodiments and implementations.

Various embodiments of the present disclosure further provide a backlight module applied to a display screen with an under-screen fingerprint identification system. The backlight module comprises a backlight source configured to provide backlight and a reflection layer. The backlight source is disposed with the fingerprint identification light source integrally and is located below the fingerprint light source. The reflection layer disposed at a side of the backlight source may reflect the backlight and transmit the fingerprint identification light. It should be noted that the backlight module set forth by the embodiments of the present disclosure may be the backlight module 100 of the display screen 10 described in above embodiments and implementations.

Various embodiments of the present disclosure further provide a light source assembly applied to a display screen with an under-screen fingerprint identification system. The light source assembly comprises a fingerprint light source configured to provide fingerprint identification light, a backlight source configured to provide backlight, and a first holder and a second holder disposed integrally. The backlight source is disposed in the first holder, and the fingerprint identification light source is disposed in the second one. It should be noted that the light source assembly set forth by the embodiments of the present disclosure may be applied to the display screen 10 described in above embodiments and implementations.

In some embodiments, the first holder is disposed below the second holder.

In some embodiments, a first opening is disposed at a side of the first holder, and a second opening is disposed at a top of the second holder.

Various embodiments of the disclosure can have one or more of the following advantages.

As the fingerprint light source and the backlight source are disposed integrally and the fingerprint light source is disposed above the backlight source, the fingerprint light source does not occupy transverse space of the electronic device, and the chin size of the electronic device is effectively reduced.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "module," "components" or "layers," etc. merely reflect various logical functions according to some embodiments, and actual implementations can have other divisions of "regions," "module," "components" or "layers," etc. realizing similar functions as described above, or without divisions. For example, multiple regions, module, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, module, blocks, or portions may have modular configurations, or are composed of discrete components, but nonetheless can be referred to as "modules" in general. In other words, the "components," "modules," "blocks," "portions," or "module" referred to herein may or may not be in modular forms, and these phrases may be interchangeably used.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A display screen, comprising:
    a display panel;
    a backlight module, disposed under the display panel and comprising a backlight source configured to provide backlight;
    an under-screen fingerprint identification system, comprising a fingerprint light source configured to provide fingerprint identification light, a fingerprint sensor configured to receive the fingerprint identification light; and
    a first holder and a second holder formed integrally and fixed under the display panel, wherein the first holder as a whole is located directly below the second holder, the backlight source is disposed within the first holder, and the fingerprint light source is disposed within the second holder, a first opening is disposed at a side of the first holder, and a second opening is disposed at a top of the second holder, the first opening is oriented horizontally toward a light guide part to form a lateral U-shaped holder to realize a function of side emission, and the second opening is oriented vertically toward the display panel to form an upward U-shaped holder to realize a function of top illumination such that light emitting direction of the fingerprint light source is away from the backlight source, wherein the fingerprint light source and the backlight source are disposed integrally to form a twin structure and the fingerprint light source is located above the backlight source; the fingerprint sensor is disposed under the backlight module, and the fingerprint sensor is disposed under the backlight module, and the fingerprint light source does not occupy transverse space of the display screen; and the display screen is configured to have the fingerprint identification light emitted from the fingerprint light source transmit through the display panel to a finger, be reflected by the finger and then transmitted through the display panel and the backlight module to the fingerprint sensor.

2. The display screen according to claim 1, wherein the display panel comprises a flexible circuit board electrically connected with the fingerprint sensor, a first metal wiring is disposed on the flexible circuit board, and a first light avoidance area is formed at a position of the first metal wiring corresponding to the second opening.

3. The display screen according to claim 1, wherein the display panel comprises a TFT substrate electrically connected with the flexible circuit board, a second metal wiring is disposed on the TFT substrate, and a second light avoidance area is formed at a position of the second metal wiring corresponding to the second opening.

4. The display screen according to claim 2, wherein the display panel comprises a TFT substrate electrically connected with the flexible circuit board, a second metal wiring is disposed on the TFT substrate, and a second light avoidance area is formed at a position of the second metal wiring corresponding to the second opening.

5. The display screen according to claim 1, wherein wavelength range of the light emitted from the fingerprint light source is different from that of the backlight emitted from the backlight source.

6. The display screen according to claim 5, wherein the fingerprint light source is an infrared source and the backlight source is a white light source.

7. The display screen according to claim 1, wherein the backlight module further comprises a reflection layer disposed at a side of the backlight source and configured to reflect the backlight and transmit the fingerprint identification light.

8. The display screen according to claim 7, wherein the backlight module further comprises a casing in which the backlight source and the reflection layer are disposed, the casing is provided with a through-hole through which the fingerprint identification light pass, and the finger sensor is disposed corresponding to the through-hole under the casing.

9. The display screen according to claim 8, wherein an absorbing coating for absorbing the fingerprint identification light is disposed at an inner surface of the casing.

10. An electronic device, comprising the display screen according to claim 1, and a device body assembled with the display screen.

11. The electronic device according to claim 10, wherein:
a reflection layer disposed at a side of the backlight source, and configured to reflect the backlight and transmit the fingerprint identification light.

12. The electronic device according to claim 11, further comprising a light source assembly including the fingerprint light source configured to provide the fingerprint identification light, the backlight source configured to provide backlight, and the first holder and the second holder disposed integrally.

13. The electronic device according to claim 12, wherein the fingerprint light source and the backlight source are disposed integrally and the fingerprint light source is disposed above the backlight source such that the fingerprint light source does not occupy transverse space of the electronic device, and a size of a chin of the electronic device is effectively reduced.

14. The electronic device according to claim 13, wherein the electronic device is a mobile phone, and the chin of the mobile phone is a lower portion of the mobile phone.

15. The electronic device according to claim 14, wherein the display screen is a liquid crystal (LCD) display.

16. The electronic device according to claim 15, wherein the backlight module further comprises a diffusion layer configured to diffuse the backlight evenly such that light intensity at an out-light surface of the backlight module even, and diffusion of at least a part of the fingerprint identification light with fingerprint information is less than or equal to a predetermined threshold, thereby avoiding to diffuse the fingerprint identification light with fingerprint information to cause distortion.

* * * * *